(12) United States Patent
Kobayashi

(10) Patent No.: US 9,311,469 B2
(45) Date of Patent: Apr. 12, 2016

(54) AUTHORIZATION SERVER SYSTEM, CONTROL METHOD THEREOF, AND NON-TRANSITORY COMPUTER-READABLE MEDIUM

(71) Applicant: CANON KABUSHIKI KAISHA, Tokyo (JP)

(72) Inventor: Makoto Kobayashi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/299,595

(22) Filed: Jun. 9, 2014

(65) Prior Publication Data

US 2014/0380428 A1 Dec. 25, 2014

(30) Foreign Application Priority Data

Jun. 21, 2013 (JP) ................................ 2013-131063

(51) Int. Cl.
*G06F 21/33* (2013.01)
*H04L 29/06* (2006.01)

(52) U.S. Cl.
CPC .............. *G06F 21/335* (2013.01); *H04L 63/10* (2013.01); *G06F 2221/2145* (2013.01)

(58) Field of Classification Search
None
See application file for complete search history.

(56) References Cited

U.S. PATENT DOCUMENTS

| 7,284,040 | B2 | 10/2007 | Kobayashi |
| 7,409,431 | B2 | 8/2008 | Yamaguchi |
| 7,519,656 | B2 | 4/2009 | Yamaguchi |
| 7,603,409 | B2 | 10/2009 | Kobayashi |
| 8,281,372 | B1 * | 10/2012 | Vidal ................................ 726/5 |
| 2005/0044423 | A1 * | 2/2005 | Mellmer et al. .............. 713/201 |
| 2009/0119672 | A1 * | 5/2009 | Bussard et al. ................ 718/104 |
| 2009/0172793 | A1 * | 7/2009 | Newstadt et al. .................. 726/6 |
| 2010/0257358 | A1 * | 10/2010 | Grajek et al. ................. 713/158 |
| 2012/0331540 | A1 * | 12/2012 | Hoffman et al. ................ 726/10 |
| 2013/0219461 | A1 * | 8/2013 | Esaki ..................... H04L 63/08 726/1 |

OTHER PUBLICATIONS

D. Hardt, "The O Auth 2.0 Authorization Framework", [online], Oct. 2012, IETF, [searched on Jul. 6, 2013], (Internet <URL:http://tools.ietf.org/html/rfc6749>).

* cited by examiner

*Primary Examiner* — Hadi Armouche
*Assistant Examiner* — Malcom Cribbs
(74) *Attorney, Agent, or Firm* — Fitzpatrick, Cella, Harper & Scinto

(57) ABSTRACT

An authorization server system that manages authorization information configured to enable providing of a service without requiring input of authentication information, comprises: a management unit which manages the authorization information; a providing unit which provides a deletion screen that includes the authorization information generated when an authorization operation of a user is performed but not the authorization information generated without performing the authorization operation of the user in accordance with reception of a request of the deletion screen configured to delete the authorization information managed by the management unit; and a deletion unit which deletes the authorization information managed by the management unit, in accordance with reception of a deletion instruction via the deletion screen.

9 Claims, 16 Drawing Sheets

FIG. 6

| AuthzCode | AuthnToken | CLIENT DISPLAY | CLIENT OPERATION RELEASE |
|---|---|---|---|
| ○ | ○ | ○ | × |
| ○ | × | ○ | ○ |
| × | ○ | × | × |
| × | × | × | × |

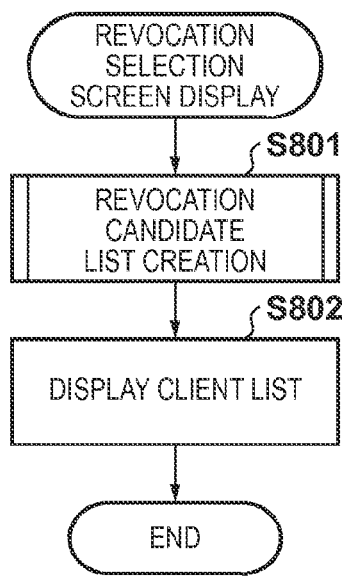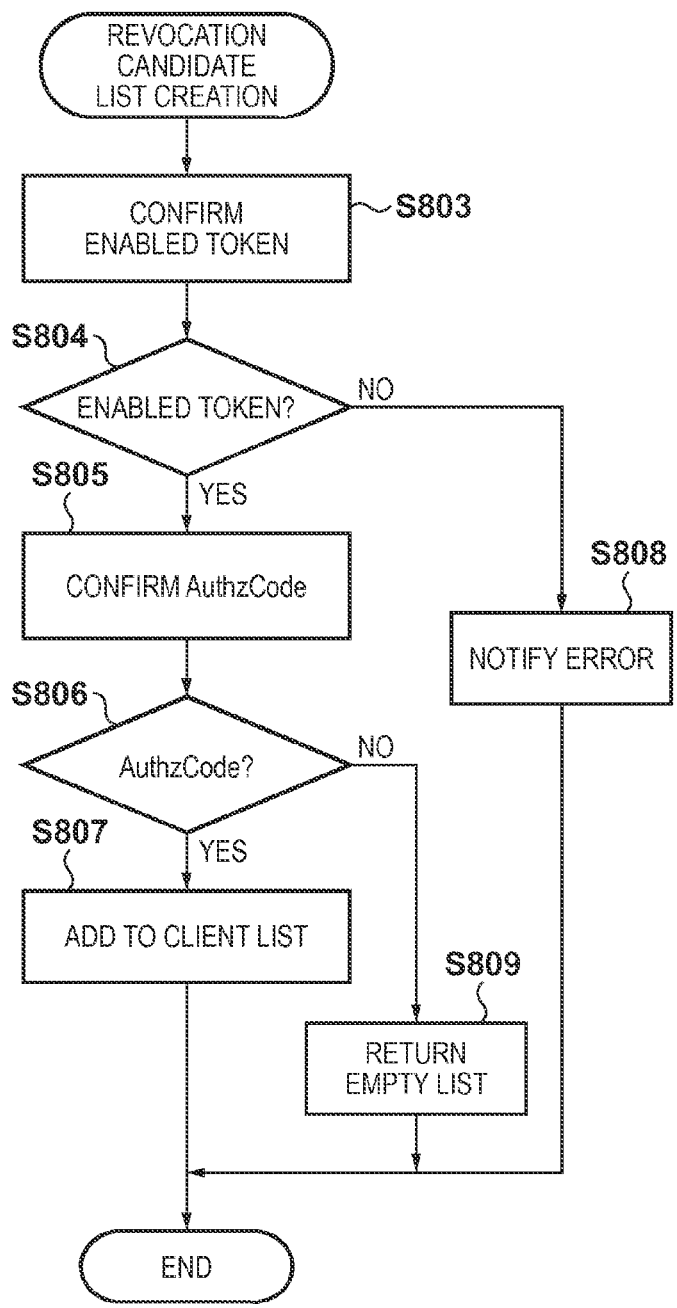
FIG. 7A
FIG. 7B

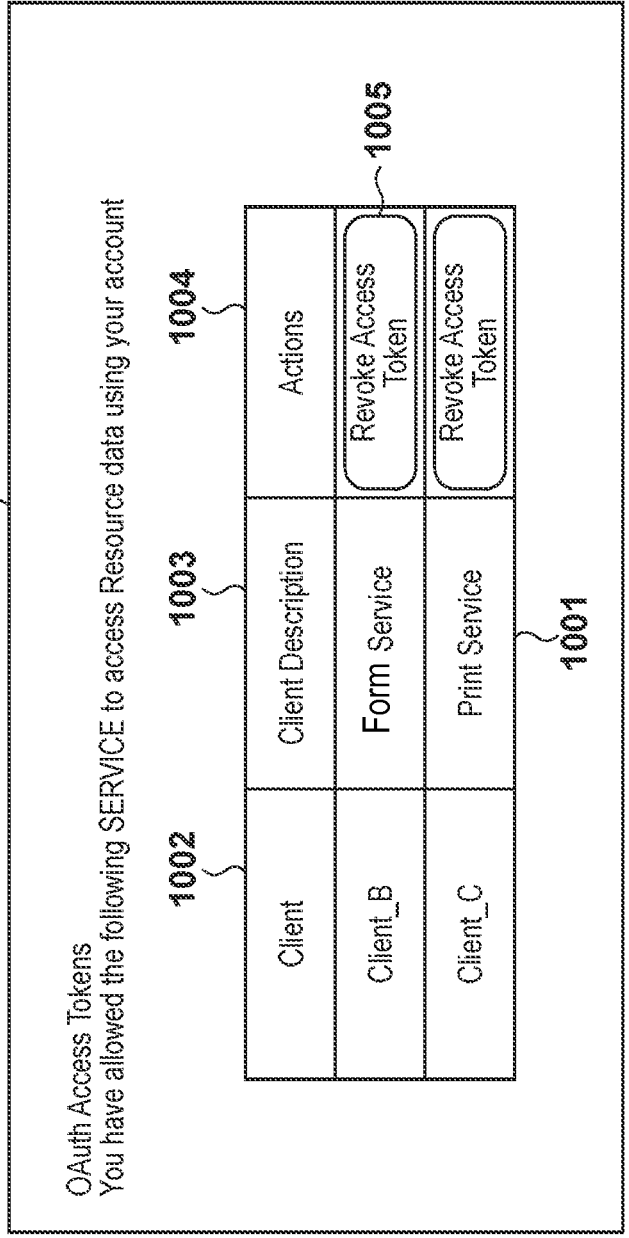

FIG. 10A

USER MANAGEMENT TABLE — 1401

| USER ID 1402 | PASSWORD 1403 | USER TYPE 1404 |
|---|---|---|
| uid00000001 | ******** | USER |
| dev00000001 | ************ | CLIENT |
| uid00000002 | ************ | USER |

FIG. 10B

CLIENT MANAGEMENT TABLE — 1405

| CLIENT ID 1406 | CLIENT NAME 1407 | REDIRECT URL 1408 | SERIAL NUMBER 1409 |
|---|---|---|---|
| Client_A | ************ | https://dev01/redirect_A | #0000001 |
| Client_B | FormService | https://dev01/redirect_B | #0000001 |
| Client_C | PrintService | https://dev01/redirect_C | #0000001 |

FIG. 10C

TOKEN MANAGEMENT TABLE — 1410

| TOKEN ID 1411 | TOKEN TYPE 1412 | EXPIRATION DATE 1413 | SCOPE 1414 | REFRESH TOKEN ID 1415 | REFRESH EXPIRATION DATE 1416 | CLIENT ID 1417 | USER ID 1418 | APPLICATION ID 1419 | Grant type 1420 |
|---|---|---|---|---|---|---|---|---|---|
| AH_000000 | AUTHENTICATION TOKEN | 2013/09/30 11:00:00 | RESOURCE A | | | Client_A | uid00000001 | app00000001 | AuthnToken |
| AT_000001 | ACCESS TOKEN | 2013/09/30 12:00:00 | RESOURCE A | RT_000001 | 2014/09/30 12:00:00 | Client_A | uid00000001 | app00000001 | AuthnToken |
| AH_000002 | AUTHENTICATION TOKEN | 2013/09/30 13:00:00 | RESOURCE A | | | Client_B | uid00000001 | app00000002 | AuthzCode |
| AT_000003 | AUTHORIZATION CODE | 2013/09/30 14:00:00 | RESOURCE A | | | Client_B | uid00000001 | | AuthzCode |
| AT_000004 | ACCESS TOKEN | 2013/09/30 15:00:00 | RESOURCE A | RT_000002 | 2014/09/30 12:00:00 | Client_B | uid00000001 | | AuthzCode |
| AH_000005 | AUTHENTICATION TOKEN | 2013/09/30 11:00:00 | RESOURCE A | | | Client_C | uid00000001 | app00000001 | AuthnToken |
| AT_000006 | ACCESS TOKEN | 2013/09/30 12:00:00 | RESOURCE A | RT_000001 | 2014/09/30 12:00:00 | Client_C | uid00000001 | app00000001 | AuthnToken |
| AH_000007 | AUTHENTICATION TOKEN | 2013/09/30 13:00:00 | RESOURCE B | | | Client_C | uid00000001 | app00000002 | AuthzCode |
| AT_000008 | AUTHORIZATION CODE | 2013/09/30 14:00:00 | RESOURCE B | | | Client_C | uid00000001 | | AuthzCode |
| AT_000009 | ACCESS TOKEN | 2013/09/30 15:00:00 | RESOURCE B | BRT_000003 | 2014/09/30 13:00:00 | Client_C | uid00000001 | | AuthzCode |

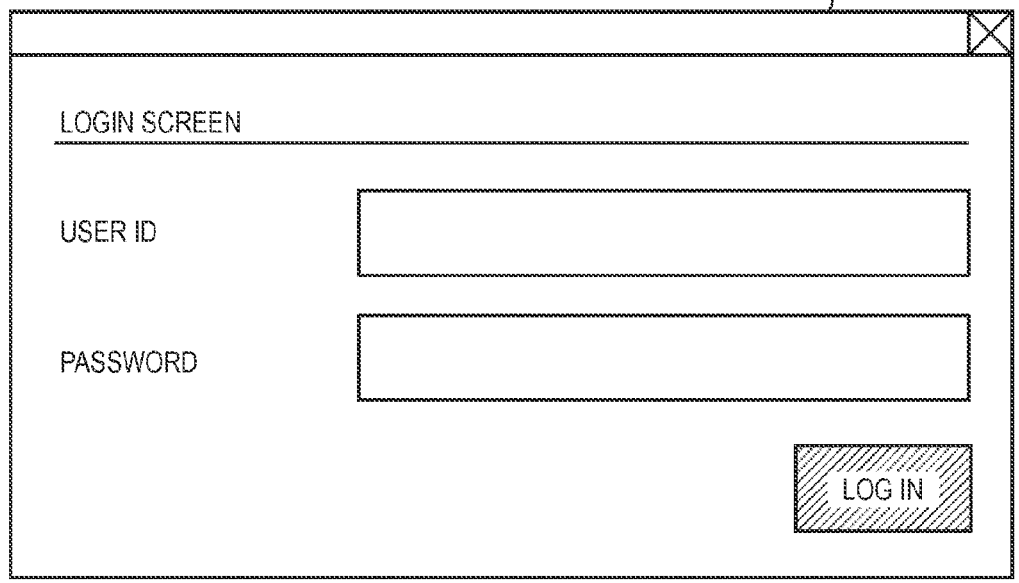
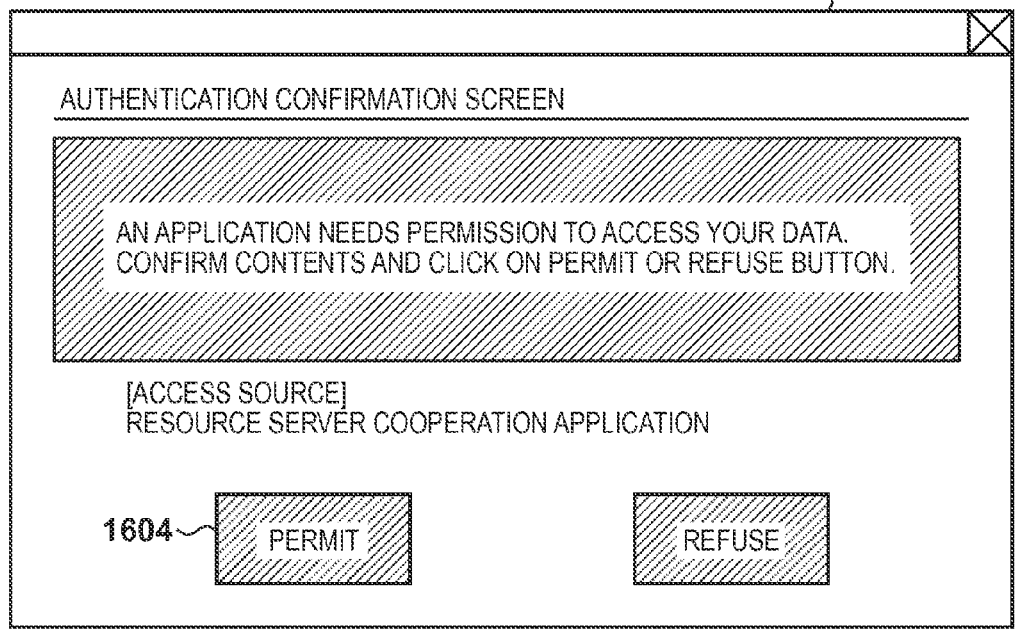

F I G. 13A

CLIENT MANAGEMENT TABLE 1700

| CLIENT ID 1701 | CLIENT SECRET 1702 | ENDPOINT URL 1703 | REDIRECT URL 1704 |
|---|---|---|---|
| Client_B | ************** | https://authz/oauth | https://dev01/redirect_B |

F I G. 13B

TOKEN MANAGEMENT TABLE 1705

| USER ID 1706 | TOKEN ID 1707 | REFRESH TOKEN ID 1708 |
|---|---|---|
| user001 | AT_000001 | RT_000001 |
| user002 | AT_000003 | RT_000002 |

FIG. 14A

CLIENT MANAGEMENT TABLE ~1800

| CLIENT ID 1801 | CLIENT SECRET 1802 | ENDPOINT URL 1803 | REDIRECT URL 1804 |
|---|---|---|---|
| Client_C | ************ | https://authz/oauth | https://dev01/redirect_C |

FIG. 14B

PARENT TOKEN MANAGEMENT TABLE ~1805

| USER ID 1806 | TOKEN ID 1807 | REFRESH TOKEN ID 1808 |
|---|---|---|
| user001 | AT_000001 | RT_000001 |
| user002 | AT_000003 | RT_000002 |

FIG. 16

TOKEN MANAGEMENT TABLE 2000

| AUTHORIZATION TOKEN ID (2001) | TOKEN TYPE (2002) | EXPIRATION DATE (2003) | SCOPE (2004) | REFRESH TOKEN ID (2005) | REFRESH EXPIRATION DATE (2006) | CLIENT ID (2007) | USER ID (2008) | APPLICATION ID (2009) | Grant type (2010) |
|---|---|---|---|---|---|---|---|---|---|
| AT_000000 | AUTHORIZATION CODE | 2013/09/30 11:00:00 | RESOURCE A | | | dev00000001 | uid00000001 | | AuthnToken |
| AT_000001 | PARENT TOKEN | 2013/09/30 12:00:00 | RESOURCE A | RT_000001 | 2014/09/30 12:00:00 | dev00000001 | uid00000001 | | AuthzCode |
| AT_000002 | CHILD TOKEN | 2013/09/30 13:00:00 | RESOURCE A | | | dev00000001 | uid00000001 | app00000001 | AuthzCode |
| AT_000003 | PARENT TOKEN | 2013/09/30 16:00:00 | RESOURCE A | RT_000002 | 2014/09/30 16:00:00 | dev00000001 | uid00000002 | | AuthzCode |
| | | | | | | | | | AuthzCode |

AUTHORIZATION SERVER SYSTEM, CONTROL METHOD THEREOF, AND NON-TRANSITORY COMPUTER-READABLE MEDIUM

BACKGROUND OF THE INVENTION

1. Field of the Invention

The present invention relates to an authorization server system, a control method thereof, and a non-transitory computer-readable medium and, more particularly, to an access token deletion method when a plurality of services cooperate.

2. Description of the Related Art

In recent years, a plurality of services provided on the Internet can cooperate to provide new added values to users. On the other hand, the cooperation of the plurality of services poses some problems. For example, there is a risk of leaking user data or personal information because information more than a user's desire is exchanged between the services. From the point of view of service providers, however, the mechanism of service cooperation is preferably easily implemented.

Under these circumstances, a standard protocol called OAuth that is configured to implement cooperation in authorization has been planned. According to OAuth, for example, data of a user managed by a service A is accessible by an external service B that has received a permission from the user. At this time, the service A clarifies the range accessible by the external service B and obtains an explicit authorization of the user for the access by the external service B. Explicit authorization giving by the user will be referred to as an "authorization operation".

When the user performs the authorization operation, the external service B receives a token (to be referred to as an "authorization token" hereinafter) certifying that it is has been granted access from the service A. From then on, by using the authorization token, subsequent access can be implemented without the user's authentication information on the authority of the user who has given the authorization. Hence, the external service B that has obtained the authorization token when authorized by the user is given a duty to closely and properly manage the authorization token.

OAuth 2.0 assumes that a user can disable an access token (see D. Hardt, "The OAuth 2.0 Authorization Framework", [online], October 2012, IETF, [searched on Jul. 6, 2013], Internet <URL: http://tools.ietf.org/html/rfc6749>). Token revocation is the specification of a protocol configured to disable various kinds of tokens defined by OAuth 2.0. This defines a request/response to disable, from the client side, an access token or refresh token issued based on OAuth 2.0. For example, it is also possible to define disconnecting a session and the like linked with Authorization Code Grant together in accordance with implementation of an authorization server. This specification is assumed to be used in a use case where various kinds of tokens are disabled from the client side at the time of, for example, release of service cooperation/logout/ resignation of service membership.

However, in some cases, an access token should not be deleted in an authorization flow like OAuth. This applies to, for example, a case where a token to be used in service cooperation within the same authentication domain is generated without user confirmation in a certain authorization flow. In this case, the same authentication domain indicates a domain in which a server having authentication and authorization functions and a client application server for providing a form service, a print service, or the like are connected to the same LAN, and a problem such as information leakage hardly arises between the services. If a token necessary for service cooperation can be deleted in the same authentication domain, data mismatch may occur at the time of cooperation. For example, when a print service and a form service cooperate, and only an access token to the print service is disabled, the user can create a form but cannot print.

SUMMARY OF THE INVENTION

According to one aspect of the present invention, there is provided an authorization server system that manages authorization information configured to enable providing of a service without requiring input of authentication information, comprising: a management unit configured to manage the authorization information; a providing unit configured to provide a deletion screen that includes the authorization information generated when an authorization operation of a user is performed but not the authorization information generated without performing the authorization operation of the user in accordance with reception of a request of the deletion screen configured to delete the authorization information managed by the management unit; and a deletion unit configured to delete the authorization information managed by the management unit, in accordance with reception of a deletion instruction via the deletion screen.

According to another aspect of the present invention, there is provided a control method of an authorization server system that manages authorization information configured to enable providing of a service without requiring input of authentication information, comprising: a management step of managing the authorization information in a storage unit; a providing step of providing a deletion screen that includes the authorization information generated when an authorization operation of a user is performed but not the authorization information generated without performing the authorization operation of the user in accordance with reception of a request of the deletion screen configured to delete the authorization information managed in the storage unit; and a deletion step of deleting the authorization information managed in the storage unit in accordance with reception of a deletion instruction via the deletion screen.

According to another aspect of the present invention, there is provided a non-transitory computer-readable medium storing a program that causes a computer to function as: a management unit configured to manage authorization information configured to enable providing of a service without requiring input of authentication information; a providing unit configured to provide a deletion screen that includes the authorization information generated when an authorization operation of a user is performed but not the authorization information generated without performing the authorization operation of the user in accordance with reception of a request of the deletion screen configured to delete the authorization information managed by the management unit; and a deletion unit configured to delete the authorization information managed by the management unit in accordance with reception of a deletion instruction via the deletion screen.

According to the present invention, it is possible to limit deletion of an access token used in the same authentication domain and prevent data mismatch at the time of service cooperation.

Further features of the present invention will become apparent from the following description of exemplary embodiments (with reference to the attached drawings).

BRIEF DESCRIPTION OF THE DRAWINGS

FIG. 6 is a table showing the relationship of client display/nondisplay and client cooperation release enable/disable;

FIGS. 7A and 7B are flowcharts showing processing associated with display of a revocation selection screen;

FIG. 9 is a view showing an example of the GUI of a token revocation Web application;

FIGS. 10A, 10B, and 10C are views showing examples of the arrangements of various management tables provided in an authorization server;

FIGS. 12A and 12B are views showing examples of the arrangements of various screens;

FIGS. 13A and 13B are views showing examples of the arrangements of various management tables provided in a client application server 300;

FIGS. 14A and 14B are views showing examples of the arrangements of various management tables provided in a client application server 350;

FIG. 16 is a view showing an example of the arrangement of an authorization token management table according to the second embodiment.

DESCRIPTION OF THE EMBODIMENTS

<First Embodiment>

An embodiment of the present invention will now be described with reference to the accompanying drawings.

In this embodiment, a description will be made assuming that a form service for generating form data and a print service for obtaining and printing data are installed in servers on the Internet. A service that provides a function on the Internet, like the form service and the print service, will be referred to as a "resource service" hereinafter.

In this embodiment, a description will be made assuming that a print application and a form application installed in an image forming apparatus and the like use the resource services. An application that uses a resource service, like the print application and the form application, will be referred to as a "resource service cooperation application" hereinafter. The resource services are not limited to the form service and the print service, and the applications are not limited to the form application and the print application, as a matter of course.

Authority delegation according to this embodiment uses the mechanism of OAuth. In OAuth, authorization information called a "token" is used as information to certify an authority delegated from a user.

In this embodiment, a plurality of authentication domains (security domains) exist. The flows of token issuance and resource service use change between a case where data communication is performed between apparatuses or services belonging to the same authentication domain and a case where data communication is performed between apparatuses or services belonging to different authentication domains. Details will be described later.

[Case Where Resource Service is Used in Same Authentication Domain Using Authentication Token]

An arrangement in a case where a resource service is used between apparatuses or services belonging to the same authentication domain using an authentication token will be described.

[System Arrangement]

Figure 1:
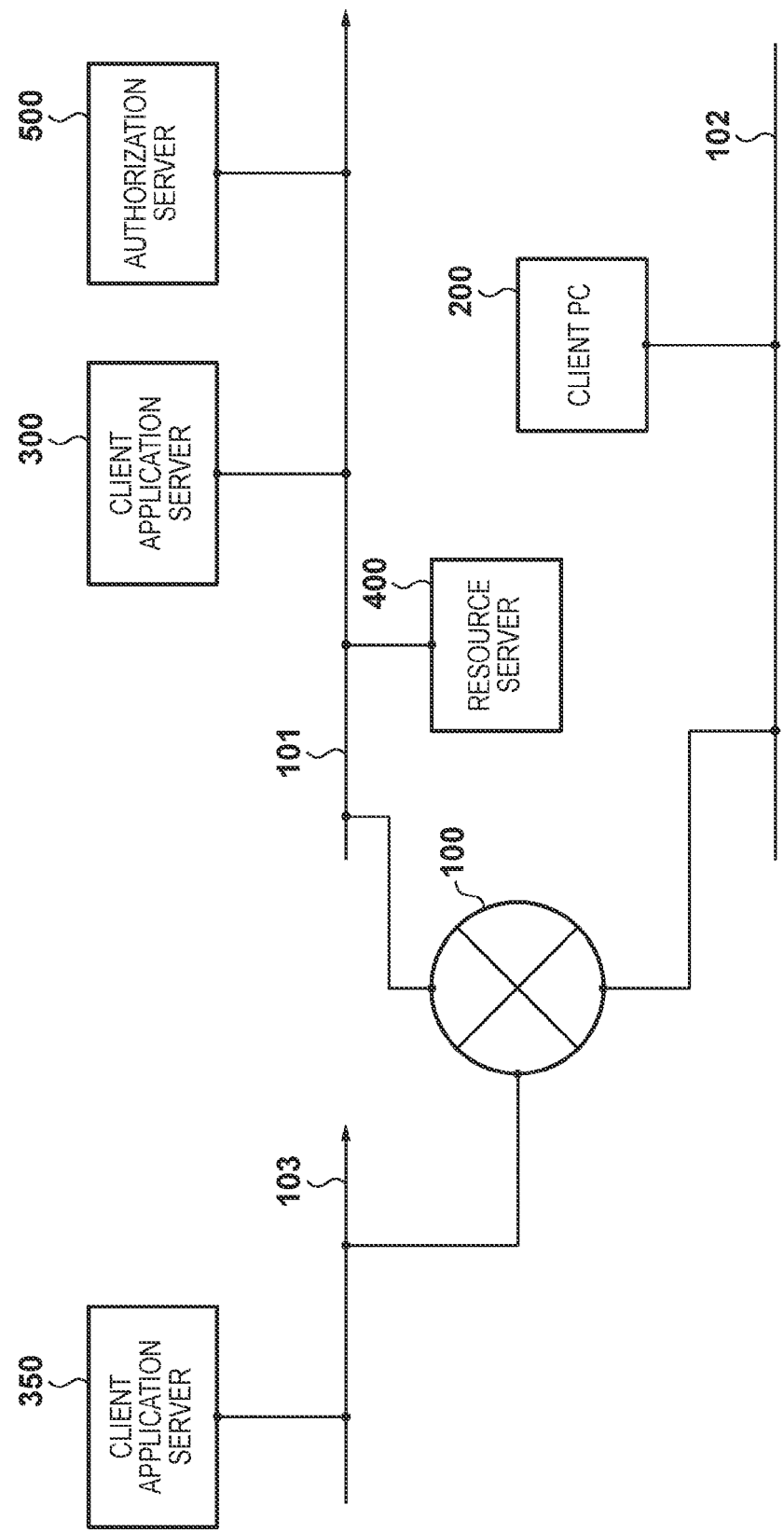
FIG. 1 is a block diagram showing an example of a system arrangement.

FIG. 1 illustrates an example of the arrangement of an authorization system according to this embodiment. A case where a resource service is used in the same authentication domain using an authentication token will be described. A WAN (Wide Area Network) 100 is a network in which a WWW (World Wide Web) system is constructed. LANs (Local Area Networks) 101 and 102 are networks that connect constituent elements.

An authorization server 500 that is an authorization server system supports OAuth, and an authorization service module is installed in it. A client application server 300 implements a client in the OAuth. In this embodiment, a client application capable of cooperating with a resource service is installed in the client application server 300 as a resource service cooperation application. In this case, the client applications include a print application and a form application. The user uses a resource service using a client application. Note that one or a plurality of client applications can be installed in one client application server.

An application that provides a resource service such as a print service or a form service is installed in a resource server 400. Note that one or a plurality of resource services can be installed in one resource server. A client PC 200 is an information processing apparatus operated by the user. The user accesses the client application server 300 using a Web browser 210 provided in the client PC 200, and uses a service such as a print service or a form service using a resource provided by the resource server 400. As a characteristic feature of this embodiment, the client application server 300 and the resource server 400 are connected to the same LAN 101 as the authorization server 500. That is, the client application server 300, the resource server 400, and the authorization server 500 are connected to each other without intervening the WAN 100. For this reason, in this embodiment, they are regarded as belonging to the same authentication domain, and service cooperation between the client application server 300 and the resource server 400 is performed by one authentication.

The client PC 200 is connected to the client application server 300 and the resource server 400 via the WAN 100 and the LANs 101 and 102. Note that the client PC 200 and the servers may be constructed either on separate LANs or on the same LAN. They may be constructed on the same PC.

[Hardware Arrangement]

Figure 2:
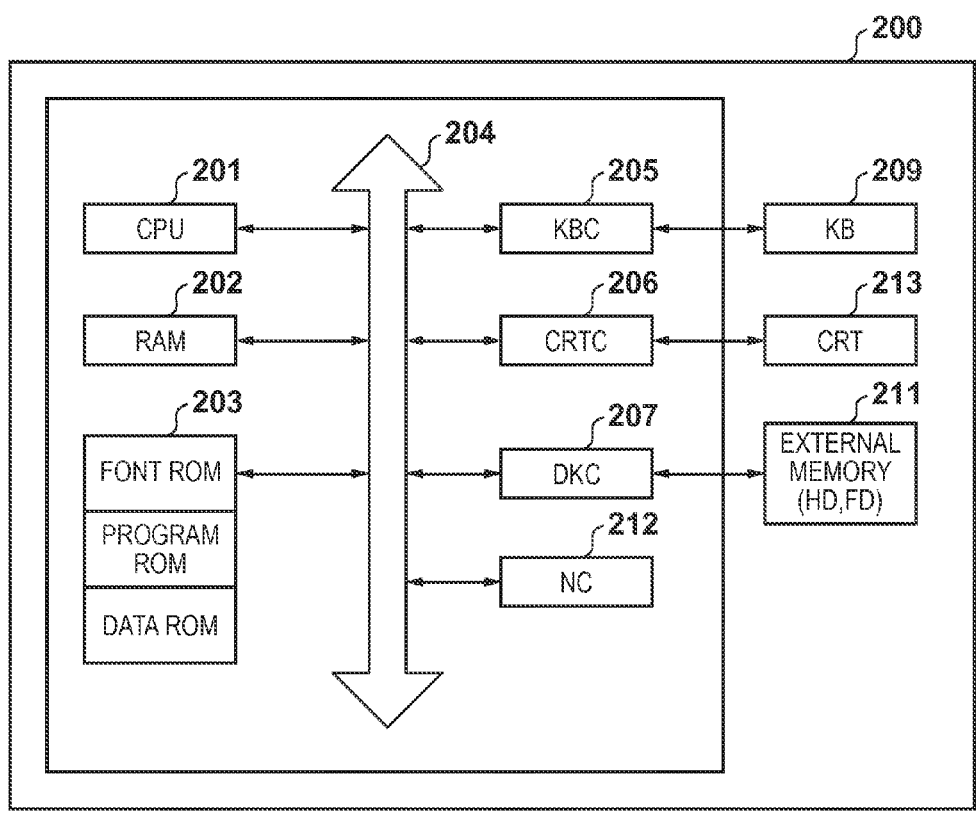
FIG. 2 is a block diagram showing an example of the hardware arrangement of each apparatus.

FIG. 2 is a block diagram showing the arrangement of the client PC 200 according to this embodiment. A description will be made assuming that the client application server 300, a client application server 350, and the resource server 400 also have the same hardware arrangement. Note that the hardware block diagram shown in FIG. 2 is equivalent to that of a general information processing apparatus. The hardware arrangement of the general information processing apparatus can be applied to the client PC 200 and server apparatuses according to this embodiment.

Referring to FIG. 2, a CPU 201 executes programs such as an OS (Operating System) and applications stored in the program ROM of a ROM 203 serving as a storage unit or loaded from a hard disk 211 to a RAM 202. Processing of each flowchart to be described later can be implemented by program execution of the CPU 201. The RAM 202 functions as a storage unit such as the main memory, work area, and the like of the CPU 201. A keyboard controller (KBC) 205 controls key input from a keyboard (KB) 209 or a pointing device (not shown). A CRT controller (CRTC) 206 controls display of a CRT display 213. A disk controller (DKC) 207 controls data access to the hard disk (HD) 211, a Floppy® disk (FD), and the like which store various kinds of data. An NC 212 is connected to a network and executes communication control processing for another device connected to the network.

Note that in the following explanation, the entity of execution on hardware is the CPU 201, and the entity on software is an application program installed in the hard disk (HD) 211 unless otherwise specified.

[Module Arrangement]

Figure 4:
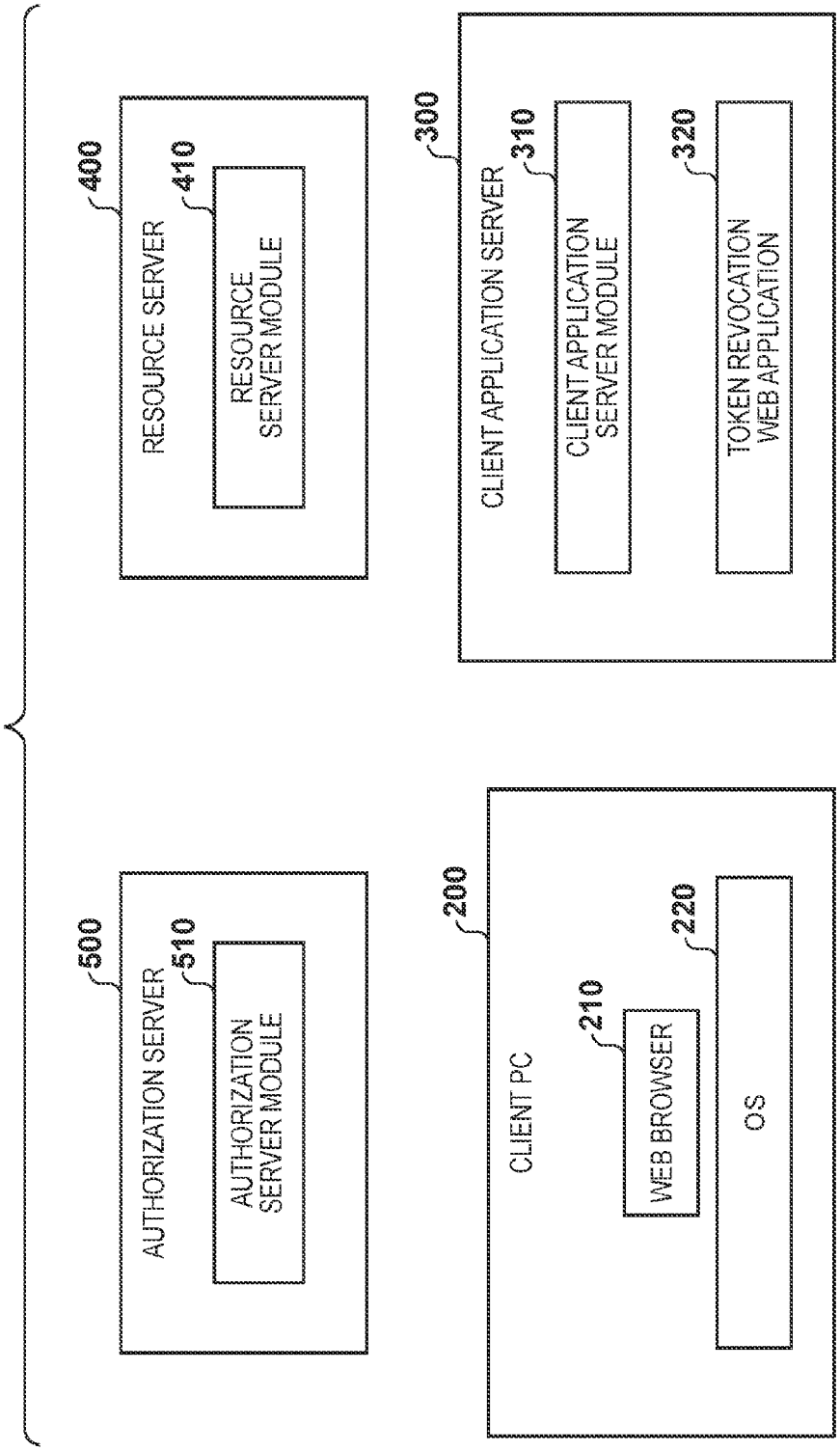
FIG. 4 is a block diagram showing an example of the module arrangement of each apparatus.

FIG. 4 illustrates an example of the module arrangement of each of the authorization server 500, the resource server 400, the client PC 200, and the client application server 300 shown in FIG. 1 according to this embodiment. The authorization server 500 includes an authorization server module 510.

The resource server 400 includes a resource server module 410. In the client PC 200, the CPU 201 executes an OS 220 stored in the ROM 203 or an external memory 204, thereby controlling each application. A real-time OS is generally used as the OS 220. However, a general-purpose OS such as Linux® may be used. The client PC 200 also includes the Web browser 210 that is a user agent configured to use the WWW.

The client application server 300 includes a client application server module 310 and a token revocation Web application 320. The client application server module 310 communicates with the authorization server 500 and the resource server 400, and performs access token obtainment, resource request, and the like. The token revocation Web application 320 receives a token revocation request from the client PC 200. The token revocation Web application 320 also has a function of obtaining a list of cooperative clients having revocation target tokens from the authorization server 500 and displaying it. The token revocation Web application 320 also has a function of selecting a client having a revocation target token from the cooperative client list, requesting the authorization server 500 to execute revocation, and displaying the revocation result.

[Table Arrangement]

FIGS. 10A to 10C show examples of the arrangements of management tables that the authorization server 500 stores in an external memory. Note that the management tables may be stored not in the external memory of the authorization server 500 but in another storage area configured to be communicable via the LAN 101.

FIG. 10A shows an example of the arrangement of a user management table 1401. The user management table 1401 includes a user ID 1402, a password 1403, and a user type 1404. The user ID 1402 is identification information used to uniquely identify a user. The authorization server 500 has a function of verifying a set of the user ID 1402 and the password 1403 and generating authentication information when the combination is correct, thereby authenticating each user or client. Details of authentication information according to this embodiment will be described later.

FIG. 10B shows an example of the arrangement of a client management table 1405. The client management table 1405 includes a client ID 1406, a client name 1407, a redirect URL 1408, and a serial number 1409. The client ID 1406 is identification information used to uniquely identify a client. Note that the client ID 1406 is associated with the user ID 1402 in the user management table 1401, and they can look up each other. The client name 1407 and the redirect URL 1408 are used in an OAuth sequence to be described later.

FIG. 10C shows an example of the arrangement of a token management table 1410. The token management table 1410 includes a token ID 1411, a token type 1412, an expiration date 1413, a scope 1414, a refresh token ID 1415, a refresh expiration date 1416, a client ID 1417, a user ID 1418, an application ID 1419, and Grant Type 1420. Details of processing of the token management table 1410 will be described later.

FIGS. 13A and 13B show examples of the arrangements of management tables that the client application server 300 stores an external memory. In this embodiment, the management tables are stored in the external memory of the client application server 300. However, they may be stored in another storage area with which the client application server 300 can communicate via the LAN 101.

FIG. 13A shows an example of the arrangement of a client management table 1700. The client management table 1700 is configured to be looked up and updated only from the client PC 200. The client management table 1700 includes a client ID 1701, a client secret 1702, an endpoint URL 1703, and a redirect URL 1704. The client ID 1701 and the client secret 1702 correspond to the user ID 1402 and the password 1403 issued and stored in the authorization server 500 in advance. As the redirect URL 1704, the same data as the information (redirect URL 1408) registered in the client management table 1405 of the authorization server 500 in association with the client ID 1406 and the client name 1407 is stored. To register these pieces of information, for example, a method of causing the client PC 200 to register them online via the LAN 101 and the WAN 100 or a method of setting values in the authorization server 500 via the user is usable. Note that the endpoint URL 1703 is the URL (Uniform Resource Locator) of an endpoint for OAuth made open by the authorization server 500.

FIG. 13B shows an example of the arrangement of a token management table 1705. The token management table 1705 is configured to be looked up and updated only from the client application server 300. The token management table 1705 includes a user ID 1706, a token ID 1707, and a refresh token ID 1708. Details of processing of the token management table 1705 will be described later.

[Sequence of Authorization Flow]

Figure 3:
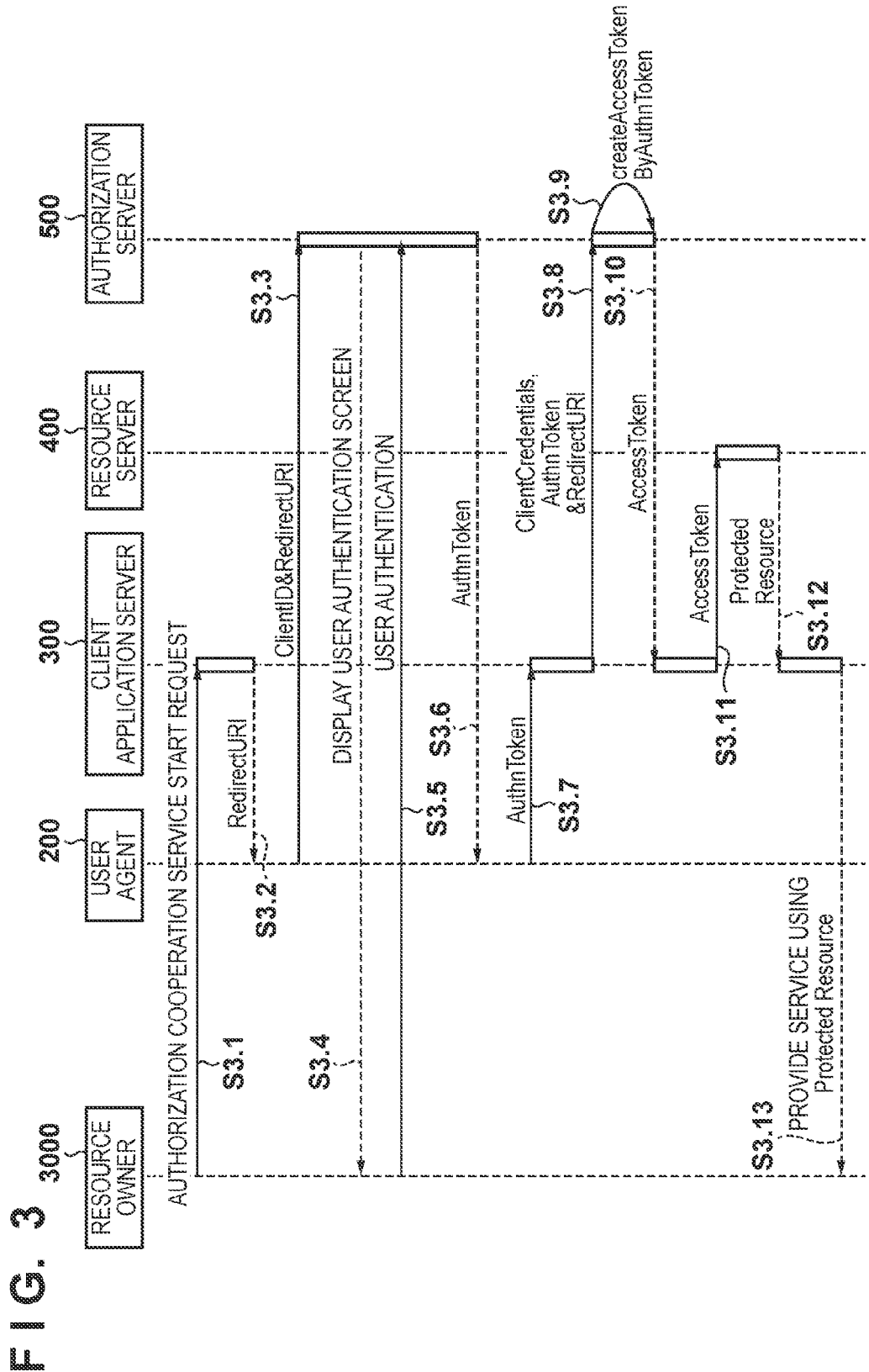
FIG. 3 is a sequence chart showing the sequence of an authorization flow when using a resource service using an authentication token in the same authentication domain.

A sequence representing an authorization flow according to this embodiment, which is configured to use a resource service using a resource service cooperation application, will be described herewith reference to FIG. 3. In the specification of OAuth 2.0, a plurality of protocol sequences according to a variety of clients will be referred to as "grant types". The authorization flow shown in FIG. 3 is a unique grant type according to this embodiment.

First, an authorization cooperation service start request arises from a user who needs to access a protected resource (step S3.1). This service request is issued to the client application server 300 by the user (resource owner 3000) using HTTP via the Web browser 210 (user agent) of the client PC 200 operated by the resource owner 3000. More specifically, the resource owner 3000 accesses an application screen (not shown) of the client application server 300 by operating the client PC 200 (step S3.1). For example, when the resource cooperation application of the client application server 300 is a print application, the application screen is a screen configured to select a document to be printed. When the resource cooperation application is a form application, the application screen is a screen configured to select a form to be created.

Accessing an application screen indicates that, for example, application screens are selectively displayed on the Web browser 210 of the client PC 200, and the user selects an arbitrary application. In accordance with selection of the application, the resource owner 3000 transmits the authorization cooperation service start request to the client application server 300 (step S3.1).

Upon receiving the authorization cooperation service start request, the client application server 300 sends a redirect request to send an authorization request of OAuth to the URL of the authentication endpoint of the authorization server 500 held in itself (step S3.2). This redirect request is sent to the browser of the client PC 200 using HTTP/1.1 status code "302". The HTTP Location header of this redirect request includes the ID of the client application server 300, the authorization flow type, and the URL of the authentication endpoint of the authorization server 500. More specifically, the redirect request is represented by https://auth.a01.c-xxx.com/CAUTH/Idps.aspx?LOCALE=ja_JP HTTP method: GET Content-Type: application/x-www-form-urlencoded A fixed character string "code" is set in a request parameter as response_type. As client_id, the application ID of the client application server 300 registered in the authorization server 500 in advance as a client application is set. As redirect_uri, the URL of the client application server 300 registered in the authorization server 500 in advance is designated. In OAuth, an authorization request may include a scope representing an authority range to be authorized. In this embodiment, a description will be made assuming that "resource A" is requested as the scope.

Figure 11:
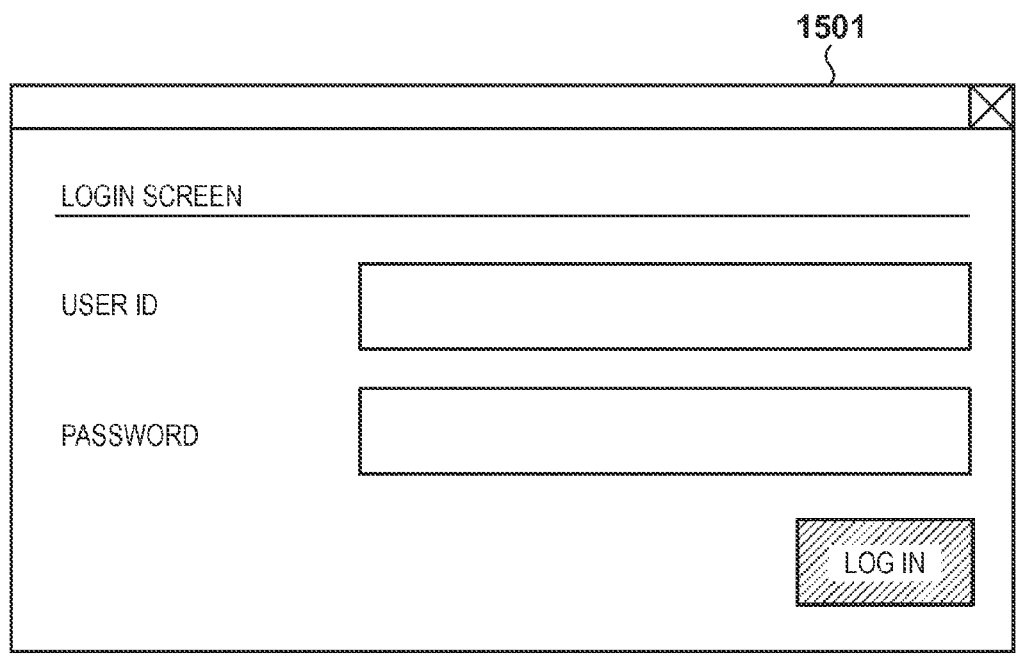
FIG. 11 is a view showing an example of the arrangement of a login screen.

The client PC 200 sends a user authentication and authorization request to the authorization server 500 in accordance with the received redirect request (step S3.3). After receiving the authorization request, the authorization server 500 displays a login screen 1501 shown in FIG. 11 on the Web browser 210 of the client PC 200 to authenticate the user (step S3.4). The resource owner 3000 inputs the user ID and password to the login screen 1501 shown on the Web browser 210 of the client PC 200 and executes login (step S3.5).

The authorization server 500 verifies whether the received set of the user ID and password matches the information registered in the user management table 1401, and when they match, generates authentication information linked with the user ID. The generated authentication information is stored in the token management table 1410. More specifically, a token ID "AH_000000" is stored in the token ID 1411 as authentication information. In addition, a character string "authentication token" is stored in the token type 1412.

The authorization server 500 also stores a predetermined expiration date of the authentication token in the expiration date 1413. Scope information ("resource A") included in the request parameter is stored in the scope 1414. The user ID input at the time of login is stored in the user ID 1418. A character string "AuthnToken" is stored in the Grant Type 1420 as a grant type. The authorization server 500 stores the authentication information in the token management table 1410 and advances to next processing.

The authorization server 500 stores a token ID (to be referred to as an "authentication token" hereinafter), which is uniquely defined for this session, in the Web browser 210 of the client PC 200 as Cookie information. The authorization server 500 returns a redirect request to the URL of the client application server 300 included in the redirect request of step S3.2 (step S3.6).

After receiving the redirect request from the authorization server 500, the Web browser 210 of the client PC 200 includes the authentication token in the request parameter and redirects it to the client application server 300 designated as the redirect destination as an authorization response (step S3.7).

After receiving the authorization response from the client PC 200, the client application server 300 sends a token request to the authorization server 500 (step S3.8). This token request includes the authentication token obtained by the authorization response, and the client ID 1701, the client secret 1702, and the redirect URL 1704 of the client management table 1700.

After receiving the token request from the client application server 300, the authorization server 500 verifies whether the authentication token included in the token request is included in the token ID 1411 of the token management table 1410. When the authentication token is included in the token management table 1410, the authorization server 500 generates an access token that enables access to the resource server 400 (step S3.9).

The generated access token is stored in the token management table 1410. That is, a token ID "AT_000001" is stored in the token ID 1411. A character string "access token" is stored in the token type 1412 as a token type. An expiration date of the authentication token predetermined by the authorization server 500 is stored in the expiration date 1413. The same value as the scope information included in the record of the authentication token already registered in the token management table 1410 is registered in the scope 1414. The user ID corresponding to the registered authentication token is registered in the user ID 1418. A character string "AuthnToken" is stored in the Grant Type 1420 as a grant type.

As described above, when the authentication token is received from the client application server 300, the authorization server 500 does not perform explicit authorization confirmation for the user. On the other hand, the authorization server 500 issues the access token (token ID "AT_000001") that enables access to the resource server 400. This is because the client application server 300, the resource server 400, and the authorization server 500 are connected in the same authentication domain without intervening the WAN 100. Note that in this embodiment, the range within the LAN 101 is regarded as the same authentication domain.

After access token generation and token information confirmation to the token management table 1410, the authorization server 500 includes the token ID "AT_000001" and the scope "resource A" in the parameters, and sends a response to the client application server 300 (step S3.10).

In step S3.10, the client application server 300 receives the token ID "AT_000001" and the scope "resource A" from the authorization server 500. The client application server 300 includes the token ID "AT_000001" and the scope "resource A" in the request parameters, and sends a resource access request to the resource server 400 (step S3.11).

After obtaining the token ID "AT_000001" and the scope "resource A", the resource server 400 determines based on the information whether to permit access to the requested resource. Assume that the ID of an application that can access the resource is set in the resource server 400 in advance. The resource server 400 compares the set application ID with an application ID obtained based on the token ID "AT_000001", thereby verifying whether to permit access. This verification is performed by causing the resource server 400 to obtain token information from the authorization server 500 using the token ID "AT_000001" and the scope "resource A" as arguments. The authorization server 500 verifies that the obtained access token has not expired yet, and the requested scope falls within the scope range, and returns the result.

Upon determining, by verification, to permit access, the resource server 400 returns the resource to the client application server 300 (step S3.12). This resource is, for example, a list of printable documents when the resource server 400 is a print service, or a list of creatable forms when the resource server 400 is a form service.

In the above description, token verification is performed by the authorization server 500 and the resource server 400 in steps S3.11 and S3.12, respectively. However, applications that can access the resource may be managed by the authorization server 500, and all verifications may be performed by the authorization server 500. In this embodiment, an application that can access the resource is determined using an application ID, as described above. However, accessibility may be determined by identifying the client application server 300 based on a serial number or client ID that can be obtained from token information. Similarly, accessibility may be determined based on a scope or user ID that can be obtained from token information.

Upon receiving the resource response, the client application server 300 constructs the above-described application screen based on the received data, and returns it to the resource owner 3000 (step S3.13).

[Case where Resource Service is Used Between Different Authentication Domains Using Authorization Code]

An arrangement in a case where a resource service is used between apparatuses or services belonging to different authentication domains using an authorization code will be described next.

[System Arrangement]

An example of an arrangement when a resource service is used between different authentication domains using an authorization code will be described with reference to FIG. 1.

Referring to FIG. 1, the client application server 350 is connected to a LAN 103 and further connected to the WAN 100.

The client application server 350 implements a client in OAuth. In this embodiment, a client application that cooperates with a resource service is installed in the client application server 350 as a resource service cooperation application. In this case, the client applications include a print application and a form application. The user uses a resource service using a resource service cooperation application. The user accesses a client application in the client application server 350 using the Web browser 210. The user uses a service such as a print service or a form service using a resource provided by a resource service in the resource server 400.

As a characteristic feature of this embodiment, the client application server 350 is connected to the LAN 103 that is different from the resource server 400 and the authorization server 500. The client application server 350 is connected to the resource server 400 and the authorization server 500 via the WAN 100. In this embodiment, they are regarded as belonging to different authentication domains, and service cooperation between the client application server 350 and the resource server 400 is performed using Authorization Code grant type of the normal OAuth protocol.

As another example of the system arrangement, the client application server 350 may exist on the LAN 101 that is the same as the authorization server 500, and the resource server 400 may exist on the LAN 103. In this case, the resource server 400 communicates with the authorization server 500 via the WAN 100. The client PC 200, the client application server 350, and the resource server 400 are connected via the WAN 100 and the LANs 101 and 102.

[Table Arrangement]

FIGS. 14A and 14B show examples of the arrangements of management tables that the client application server 350 stores in an external memory. Note that in this embodiment, the management tables are stored in the external memory of the client application server 350. However, they may be stored in another storage area with which the client application server 350 can communicate via the LAN 103.

FIG. 14A shows an example of the arrangement of a client management table 1800. The client management table 1800 is configured to be looked up and updated only from the client PC 200. The client management table 1800 includes a client ID 1801, a client secret 1802, an endpoint URL 1803, and a redirect URL 1804. The client ID 1801 and the client secret 1802 correspond to the user ID 1402 and the password 1403 issued and stored in the authorization server 500 in advance. As the redirect URL 1804, the same data as the information (redirect URL 1408) registered in the client management table 1405 of the authorization server 500 together with the client ID 1406 and the client name 1407 is stored. To register these pieces of information, for example, a method of causing the client PC 200 to register them online or a method of setting values in the authorization server 500 can be used. The endpoint URL 1803 is the URL of an endpoint for OAuth made open by the authorization server 500.

FIG. 14B shows an example of the arrangement of a parent token management table 1805. The parent token management table 1805 is configured to be looked up and updated only from the client application server 350. The token management table 1805 includes a user ID 1806, a token ID 1807, and a refresh token ID 1808. Details of processing of the parent token management table 1805 will be described later.

[Processing Sequence]

Figure 5:
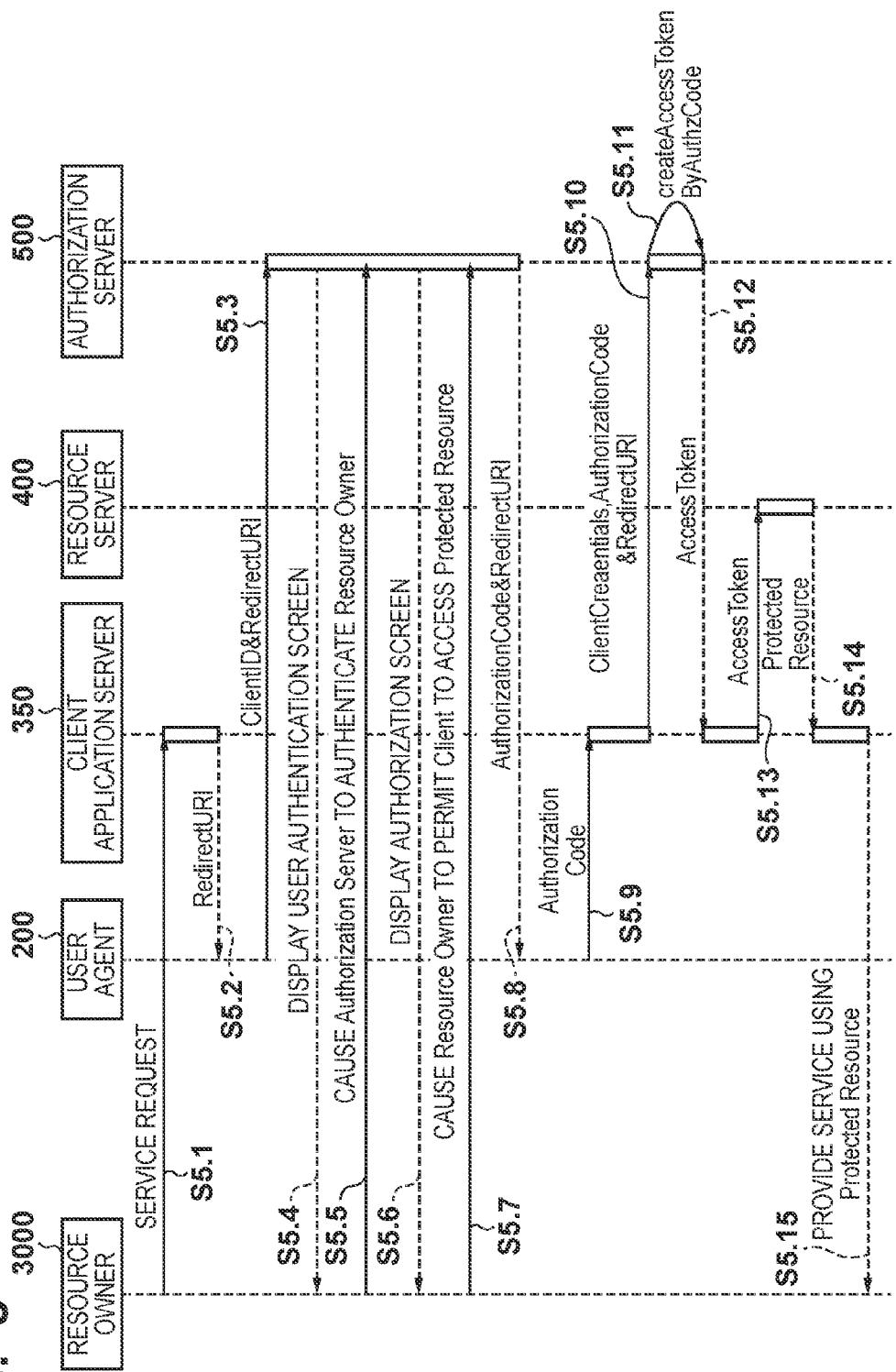
FIG. 5 is a sequence chart showing the sequence of an authorization flow when using a resource service using an authorization code between different authentication domain.

A sequence representing an authorization flow according to this embodiment, which is configured to use a resource service using a resource service cooperation application, will be described with reference to FIG. 5. As described above, in the specification of OAuth 2.0, a plurality of protocol sequences according to a variety of clients will be referred to as "grant types". The authorization flow shown in FIG. 5 is Authorization code grant type of OAuth 2.0, unlike the authorization flow shown in FIG. 3.

First, an authorization cooperation service start request arises from a user who needs to access a protected resource provided by a resource service (step S5.1). This service request is issued to the client application server 350 by the user (resource owner 3000) using HTTP via the Web browser 210 (user agent) of the client PC 200. More specifically, the resource owner 3000 accesses an application screen (not shown) of the client application server 350 by operating the client PC 200 (step S5.1).

The application screen is the same as in FIG. 3. Accessing an application screen indicates that, for example, application screens are selectively displayed on the Web browser 210, and the user selects an application. By selecting the application, the resource owner 3000 transmits the authorization cooperation service start request to the client application server 350 (step S5.1).

Upon receiving the authorization cooperation service start request, the client application server 350 sends a redirect request to send an authorization request of OAuth to the URL of the authentication endpoint of the authorization server 500 held in itself (step S5.2). This redirect request is sent to the browser of the client PC 200 using HTTP/1.1 status code "302". The HTTP Location header of this redirect request includes the ID of the client application server 350, the authorization flow type, and the URL of the authentication endpoint of the authorization server 500. More specifically, the redirect request is represented by https://auth.a01.c-xxx.com/CAUTH/
Idps.aspx?LOCALE=ja_JP
HTTP method: GET
Content-Type: application/x-www-form-urlencoded A fixed character string "code" is set in a request parameter as response_type. As client_id, the application ID of the client application server 350 registered in the authorization server 500 in advance as a client application is set. As redirect_uri, the URL of the client application server 350 registered in the authorization server 500 in advance as a client application is designated. In OAuth, an authorization request may include a scope representing an authority range to be authorized. In this embodiment, a description will be made assuming that "resource A" is requested as the scope.

The client PC 200 sends a user authentication and authorization request to the authorization server 500 in accordance with the received redirect request (step S5.3). After receiving the authorization request, the authorization server 500 displays a login screen 1602 shown in FIG. 12A on the Web browser 210 of the client PC 200 to authenticate the user (step S5.4). The resource owner 3000 inputs the user ID and password to the login screen 1602 shown on the Web browser 210 and executes login (step S5.5).

The authorization server 500 verifies whether the received set of the user ID and password matches the information registered in the user management table 1401. When they match as the result of verification, the authorization server 500 generates authentication information linked with the user ID. The generated authentication information is stored in the token management table 1410. More specifically, a token ID "AH_000002" is stored in the token ID 1411 as authentication information. In addition, a character string "authentication token" is stored in the token type 1412. An expiration date of the authentication token predetermined by the authorization server 500 is stored in the expiration date 1413. Scope information ("resource A") included in the request parameter is stored in the scope 1414. The user ID input at the time of login is stored in the user ID 1418. A character string "AuthnToken" is stored in the Grant Type 1420 as a grant type. After the authentication information is stored in the token management table 1410, the next processing is executed.

The authorization server 500 verifies whether the set of the client ID and the redirect URL included in the authorization request matches the information registered in the client management table 1405. When they match as the result of verification, the authorization server 500 obtains the client name 1407 in the client management table 1405, generates an authorization confirmation screen 1603 shown in FIG. 12B, and displays it on the Web browser 210 of the client PC 200 (step S5.6). At this time, the authorization server 500 stores the authentication information as Cookie information and returns it to the Web browser 210. Note that in this embodiment, the authorization confirmation screen 1603 displays the client name 1407 as the access source. However, the authorization confirmation screen is not limited to this screen arrangement and may be configured to, for example, additionally display a detailed description of the client or display information of the login user. When the authorization request includes scope information, the authorization confirmation screen 1603 may be configured to display information for explaining the scope range.

The resource owner 3000 executes permission on the authorization confirmation screen 1603 displayed on the Web browser 210 (step S5.7). For example, the user can instruct permission by pressing a button 1604 of the authorization confirmation screen 1603. After receiving the permission instruction, the authorization server 500 executes the following processing. The authorization server 500 issues an authorization code and registers it in the token management table 1410. At this time, the token ID "AT_000003" of the issued token is registered in the token ID 1411, and a character string "authorization code" is registered in the token type 1412. The value of a predefined expiration date is registered in the expiration date 1413. The client ID received at the time of authorization request is registered in the client ID 1417. The user ID linked with the authentication information transmitted from the browser 210 as Cookie information is registered in the user ID 1418. As an authorization response, the authorization server 500 requests to redirect the Web browser 210 to the redirect URL to which the token ID "AT_000003" is added (steps S5.8 and S5.9).

After receiving the authorization response, the client application server 350 sends an access token request to the authorization server 500 (step S5.10). The access token request includes the token ID "AT_000003" of the authorization code obtained by the authorization response, and the client ID 1801, the client secret 1802, and the redirect URL 1804 of the client management table 1800.

After receiving the access token request, the authorization server 500 performs the following verification, and generates an access token when the verification result is correct (step S5.11). The authorization server 500 verifies whether the set of the client ID and client secret received by the access token request matches the set of the user ID 1402 and password 1403 registered in the user management table 1401. Next, the authorization server 500 verifies whether the token ID "AH_000003" of the authorization code received by the access token request is registered in the token management table 1410, and the set expiration date is still valid. The authorization server 500 then verifies whether the client ID and the redirect URL received by the access token request match the client ID 1417 specified by the token ID 1411 of the token management table 1410 and the redirect URL 1408 of the client management table 1405, respectively. Note that the redirect URL 1408 may be stored by adding a column not to the client management table 1405 but to the token management table 1410, and registered at the time of authorization code issuance and verified with the added column.

If all the verifications are correct, the authorization server 500 generates an access token. The generated access token is registered in the token management table 1410. That is, a token ID "AT_000004" is stored in the token ID 1411. In addition, a character string "access token" is stored in the token type 1412 as a token type. An expiration date of the access token predetermined by the authorization server 500 is stored in the expiration date 1413. The scope information ("resource A" in this case) included in the record of the authentication token already registered in the token table is stored in the scope 1414. The user ID is stored in the user ID 1418. A character string "AuthzCode" is stored in the Grant Type 1420 as a grant type.

After access token generation and access token information confirmation to the token management table 1410, the authorization server 500 includes the token ID "AT_000004" and the scope "resource A" in the parameters, and sends a response to the client application server 350. At this time, a refresh token ID issued at the same time is also included in the response contents (step S5.12). As the access token, the token ID of the issued token is registered in the token ID 1411, a character string "access token" is registered in the token type 1412, and the expiration date 1413 is registered. Additionally, as information succeeded from the authorization code (token ID "AT_000003" in this case), the client ID 1417 and the user ID 1418 are registered. At this time, a refresh token used to refresh the access token is issued, and pieces of information thereof are registered in the refresh token ID 1415 and the refresh expiration date 1416.

After obtaining the token ID of the access token and the refresh token ID, the client application server 350 stores the token ID of the access token and the refresh token ID in the token management table 1410. The authorization server 500 displays a screen (not shown) representing that the authorization cooperation is completed on the Web browser 210 of the client PC 200.

In step S5.12, the client application server 350 receives the token ID "AT_000004" and the scope "resource A". The client application server 350 includes these pieces of information in the request parameters, and sends a resource access request to the resource server 400 (step S5.13).

After obtaining the token ID "AT_000004" and the scope "resource A", the resource server 400 determines based on the obtained information whether to permit or refuse access to the requested resource. Assume that the ID of an application that can access the resource is set in the resource server 400 in advance. The resource server 400 compares the set application ID with an application ID obtained from the token ID "AT_000004", thereby verifying whether to permit access. This verification is performed by causing the resource server 400 to obtain token information from the authorization server 500 using the token ID "AT_000004" and the scope "resource A" as arguments.

The authorization server 500 verifies that the obtained access token (token ID "AT_000004") has not expired yet, and the requested scope "resource A" falls within the scope range, and returns the verification result. Upon determining, as a result of verification, to permit access, the resource server 400 returns the resource to the client application server 350 (step S5.14). This resource is, for example, a list of printable documents when the resource server 400 is a print service, or a list of creatable forms when the resource server 400 is a form service.

In the above description, token verification is performed by the authorization server 500 and the resource server 400 in steps S5.13 and S5.14, respectively. However, as another system arrangement, applications that can access the resource may be managed by the authorization server 500, and all verifications may be performed by the authorization server 500. In this embodiment, an application that can access the resource is determined using an application ID, as described above. However, accessibility may be determined by identifying the client application server 350 based on a serial number or client ID that can be obtained from token information. Similarly, accessibility may be determined based on a scope or user ID that can be obtained from token information.

Upon receiving the resource response, the client application server 350 constructs the above-described application screen based on the received data, and returns it to the resource owner 3000 (step S5.15).

[Token Revocation]

Token revocation according to this embodiment will be described next with reference to FIGS. 6 to 9.

Token revocation is the specification of a protocol configured to disable various kinds of tokens defined by OAuth 2.0. This can define a request/response to disable, from the client side, an access token or refresh token issued based on OAuth 2.0. For example, it is also possible to set disconnecting a session and the like linked with Authorization Code Grant together depending on implementation of an authorization server. This specification is assumed to be used in a use case where various kinds of tokens are disabled from the client side at the time of, for example, release of service cooperation/logout/resignation of service membership.

In this embodiment, the token revocation Web application 320 is installed on the client application server 300 capable of looking up the token management table 1410 existing in the authorization server 500 shown in FIG. 1. The system is configured to allow the resource owner 3000 to display and release cooperation between clients associated with himself/herself from the browser screen of the client PC 200.

As shown in the authorization flows of FIGS. 3 and 5 described above, different pieces of information are generated and managed depending on the cooperation between authentication domains. More specifically, the Grant Type and token type managed by the authorization server 500 are different. In this embodiment, token revocation is controlled using these pieces of information.

The token revocation Web application 320 performs token revocation using an API used to obtain a list of authorization clients provided by the authorization server 500 and an API used to erase the token of a client linked with a designed token. In this embodiment, these APIs are configured to be called from the token revocation Web application 320 of the client application server 300. However, token revocation may be performed by installing the token revocation Web application 320 on the client application server 350 and making the APIs callable by HTTPS.

(Revocation Selection Screen Display Processing)

FIG. 7A is a flowchart when performing revocation selection screen display in which the token revocation Web application 320 calls the authorization client list display API of the authorization server 500, and an authorization client list is displayed. This flow starts when the user who is the resource owner 3000 accesses the token revocation Web application 320 via the Web browser 210 of the client PC 200. To do this access, pieces of information of an authorization token obtained in step S3.6 of FIG. 3 or step S5.8 of FIG. 5 are needed as request parameters. The token ID of an authentication token or authorization code and the like correspond to the information of the authorization token.

The token revocation Web application 320 calls the authorization client list obtaining API of the authorization server 500 using the pieces of information of the authorization token received previously as arguments (step S801). This processing will be described in detail with reference to FIG. 7B. The token revocation Web application 320 obtains the list of authorization clients and then displays the list (step S802). This processing sequence then ends.

FIG. 7B is a flowchart of revocation candidate client list creation in the authorization server 500. The token revocation Web application 320 calls the authorization client list obtaining API of the authorization server 500 using the pieces of information of the authorization token received from the client PC 200 as parameters.

The authorization server 500 confirms whether the received authorization token is enabled (step S803). In this enable confirmation, the authorization server module 510 of the authorization server 500 looks up the token management table 1410 shown in FIG. 10C, and determines whether the received authorization token is included, thereby confirming the enable state. When the token enable confirmation has failed (NO in step S804), the authorization server module 510 notifies the user of the error (step S808), and ends the processing sequence. When the token enable confirmation has succeeded (YES in step S804), the authorization server module 510 looks up the value of the user ID 1418 of a row corresponding to the authorization token in the token management table 1410. The authorization server module 510 confirms the existence of a row where the Grant Type 1420 is "AuthzCode" in the same user ID (step S805).

When there exists no row where the Grant Type 1420 is "AuthzCode" (NO in step S806), the authorization server module 510 returns an empty list (step S809) and ends the processing sequence. When there exists a row where the Grant Type is "AuthzCode" (YES in step S806), the authorization server module 510 obtains the token ID 1411 and the client ID 1417 shown in FIG. 10C. The authorization server module 510 looks up the client management table 1405 and obtains the client name 1407 corresponding to the obtained client ID. The authorization server module 510 lists the obtained token ID, client ID, and the client name and returns the list to the token revocation Web application 320 (step S807). The processing sequence then ends.

As a characteristic feature of the present invention, tokens other than "AuthzCode" are excluded from the revocation target by looking up Grant Type of the token management table 1410. That is, tokens used between different authentication domains shown by "AuthzCode" are deleted, and the remaining tokens are not deleted, thereby preventing mismatch in the same authentication domain.

FIG. 9 illustrates an example of a GUI (Graphical User Interface) 1000 of the token revocation Web application 320 displayed on the Web browser 210 of the client PC 200. A table 1001 displays a list of token IDs, client IDs, and client names that the token revocation Web application 320 has obtained from the authorization server 500 in accordance with the flowchart shown in FIG. 7B. The table 1001 includes a client ID 1002, a client name 1003, and an Action 1004. A revocation button 1005 used to execute revocation for the obtained token ID is displayed in the Action 1004. That is, in a state in which the revocation button 1005 is selectably displayed, the corresponding token can be deleted. The revocation button 1005 is grayed out when token revocation (to be described later) has succeeded. In this case, the corresponding token cannot be deleted. The GUI 1000 provides a deletion screen that enables an instruction to delete an access token.

(Revocation Execution Screen Display Processing)

Figure 8A:
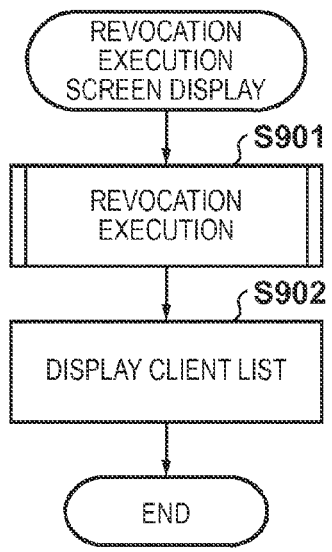
FIGS. 8A and 8B are flowcharts showing processing associated with display of a revocation execution screen.

FIG. 8A is a flowchart when the token revocation Web application 320 calls an API used to erase the token of a client linked with a designated token in the authorization server 500 and executes token revocation. This flowchart starts when the resource owner 3000 presses the revocation button 1005 on the GUI 1000 shown in FIG. 9.

When the revocation button 1005 is pressed, the token revocation Web application 320 calls the API used to erase the token of a client linked with a designated token in the authorization server 500 to execute token revocation (step S901). Details of this step will be described later in detail with reference to FIG. 8B. The token revocation Web application 320 obtains a list of clients after execution of token revocation and displays the list (step S902). The processing sequence then ends.

Figure 8B:
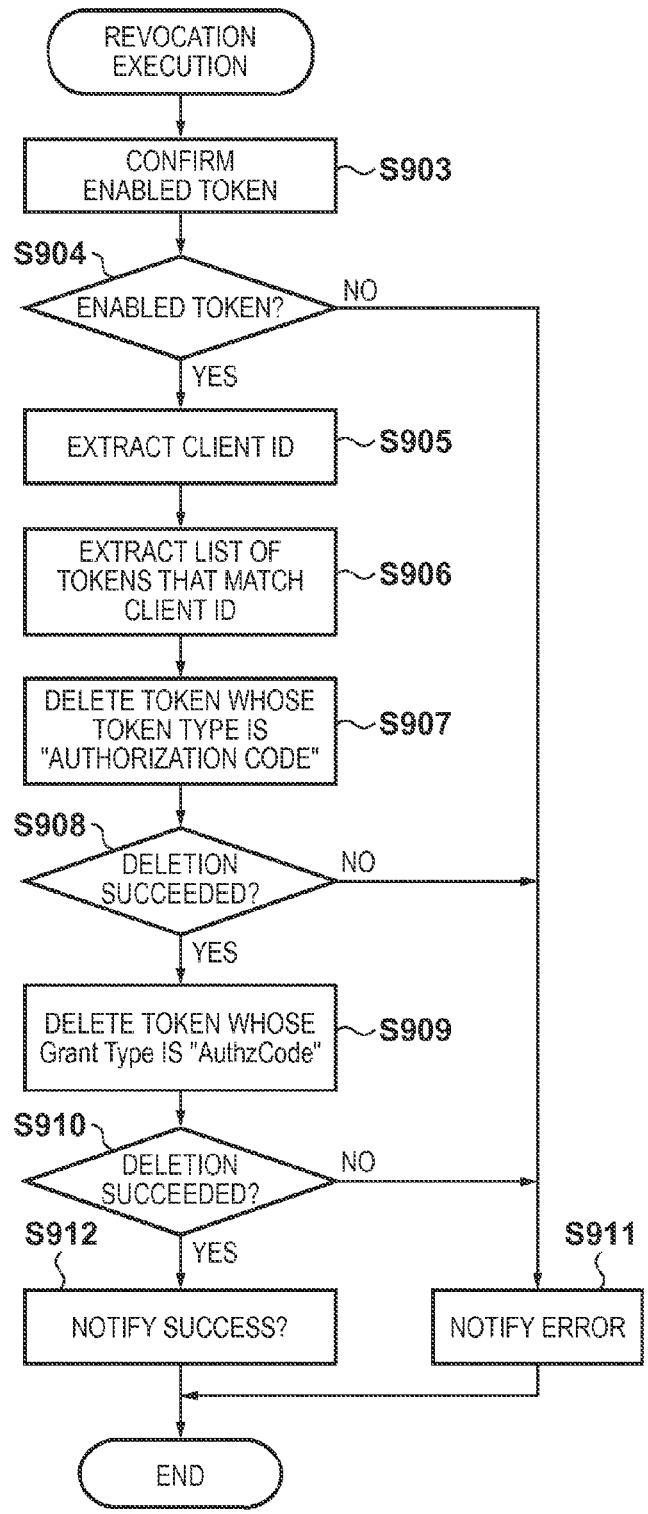

FIG. 8B is a flowchart of erasing the token of a client linked with a designated token in the authorization server 500. The token revocation Web application 320 calls the API used to erase the token of a client linked with a designated token in the authorization server 500 using pieces of information of the authorization token as parameters.

The authorization server 500 confirms whether the received authorization token is enabled (step S903). This enable confirmation is performed by causing the authorization server module 510 of the authorization server 500 to look up the token management table 1410 shown in FIG. 10C and confirm whether the received authorization token is included.

When the token enable confirmation has failed (NO in step S904), the authorization server module 510 notifies the user of the error (step S911), and ends the processing sequence. When the token enable confirmation has succeeded (YES in step S904), the authorization server module 510 looks up the value of the user ID 1418 of a row corresponding to the authorization token in the token management table 1410. The authorization server module 510 extracts a client ID linked with the received authorization token from the token of the same user ID (step S905). The authorization server module 510 also extracts tokens with matching client IDs (step S906).

The authorization server module 510 deletes, out of the tokens extracted in step S906, tokens whose token type 1412 is "authorization code" (step S907). The authorization server module 510 determines whether the token deletion has succeeded in step S907 (step S908). When the token deletion has failed (NO in step S908), the authorization server module 510 notifies the user of the error (step S911), and ends the processing sequence. When the token deletion has succeeded (YES in step S908), the authorization server module 510 further deletes, out of the extracted tokens, tokens whose Grant Type 1420 is "AuthzCode" (step S909). The authorization server module 510 determines whether the token deletion has succeeded in step S909. When the token deletion has failed (NO in step S910), the authorization server module 510 notifies the user of the error (step S911), and ends the processing sequence. When the token deletion has succeeded (YES in step S910), the authorization server module 510 notifies the user of the success of token deletion (step S912), and ends the processing sequence.

As a characteristic feature of token revocation according to this embodiment, when deleting tokens linked with the token designated by the resource owner 3000 from the token management table, a token whose token type is not "authorization code" and whose Grant Type is not "AuthzCode" is not deleted. This token corresponds to a token used when using a resource service in the same authentication domain, which has been described above in detail. In this case, as the token type 1412, "authentication token" and "access token" exist, and as the grant type, only "AuthnToken" exists. Hence, as a characteristic feature of the present invention, revocation is not performed for a token used when using a resource service in the same authentication domain.

FIG. 6 is a table showing the policy correspondence relationship of client display/nondisplay and client cooperation release enable/disable. A table 701 corresponds to the GUI 1000 of the token revocation Web application 320. "Client cooperation release" indicates that the token information is deleted from the token management table 1410 managed by the authorization server 500 to make cooperation between the client and the server impossible. That is, an access token held by a client application server is disabled to make access from the client application server 300 or 350 to the resource server 400 impossible.

The first row of the table 701 corresponds to, for example, a case where the client ID 1417 of the token management table 1410 is "Client_C". In "Client_C", both tokens whose Grant Type 1420 is "AuthnToken" and tokens of "AuthzCode" exist. In this case, the GUI 1000 of the token revocation Web application 320 displayed on the Web browser 210 displays the client ID "Client_C". When the button of the Action 1004 is pressed in the table 1001, tokens "AH_000007", "AT_000008", and "AT_000009" whose Grant Types 1420 is "AuthzCode" are erased. On the other hand, tokens "AH_000005" and "AT_000006" whose Grant Types 1420 is "AuthnToken" are not erased.

The second row of the table 701 corresponds to a case where the client ID 1417 is "Client_B". In "Client_B", only tokens whose Grant Type 1420 is "AuthzCode" exist. In this case, the GUI 1000 of the token revocation Web application 320 displays the client ID "Client_B". When the button of the Action 1004 is pressed, tokens "AH_000002", "AT_000003", and "AT_000004" whose Grant Types 1420 of the token management table 1410 is "AuthzCode" are erased. As a result, the client application server 300 becomes unable to obtain the resource of the resource server 400, and cooperation between the client application server 300 and the resource server 400 is released.

The third row of the table 701 corresponds to a case where the client ID 1417 of the token management table 1410 is "Client_A". In "Client_A", only tokens whose Grant Type 1420 is "AuthnToken" exist. In this case, the GUI 1000 of the token revocation Web application 320 displayed on the Web browser 210 does not display the client ID "Client_A". Note that although the display is not performed in this embodiment, display may be performed while graying out the revocation button 1005 in FIG. 9 to prohibit pressing of it. Alternatively, display of the revocation button 1005 may be prohibited.

The fourth row of the table 701 indicates a client whose tokens are not registered in the token management table 1410 at all. In this case as well, display on the GUI 1000 is not performed.

This makes it possible to limit deletion, by the user, of an access token used in the same authentication domain and prevent data mismatch at the time of service cooperation.

<Second Embodiment>

An embodiment concerning token deletion control when a user delegates authority to an apparatus such as an image forming apparatus at once will be described next. Note that the contents of an authorization flow are the same as those described in the first embodiment, and a description thereof will be omitted.

(Revocation of Subset Token)

In this specification, a token when a user who is a resource owner 3000 has delegated authority to an apparatus such as an image forming apparatus will be referred to as a "parent token".

Problems according to this embodiment will be explained first. For example, consider a case where a print application and a form application exist on an image forming apparatus. In this arrangement, when the user uses a resource service from the print application or form application, authorization to use the resource service needs to be individually given to each application. From the point of view of the user, however, when using the resource service from the same image forming apparatus, it is more convenient to allow the respective applications to use the resource service by one authorization operation.

When delegating authority to an application, the image forming apparatus delegates authority to the application on behalf of the user, thereby decreasing the number of times of authorization operations of the user. That is, the user grants authority delegation to an application when he/she has delegated authority to the image forming apparatus.

Note that in this embodiment, when delegating authority to the image forming apparatus, the user is caused to perform the authorization operation. However, when the image forming apparatus delegates authority to each application, the user is not caused to perform the authorization operation. However, if applications on the image forming apparatus are allowed to share a parent token obtained by the image forming apparatus as a method for performing the authorization operation only once, all applications that share the parent token can undesirably access all resource services. In addition, when each application accesses a resource service using the shared parent token, the resource service side cannot specify the application of the access source and therefore cannot determine whether the use is enabled.

As a result, for example, even when the resource server wants to permit only use from a specific application, the application cannot be specified, and it is impossible to determine whether the use is enabled. This is undesirable because when a resource service that manages a user's confidential information permits use from unspecified applications, a risk of leaking the information arises.

Even when connection from an unexpected application is permitted, there may exist a requirement to record what kind of application has accessed. This information is useful in deciding how to deal with function extension of the resource service when, for example, specifying an application with higher use frequency and extending the function in accordance with the use scene of the application.

In this embodiment, instead of directly using a parent token, each resource service cooperation application uses a token that is issued with additional information capable of specifying an application at the time of redelegation while inheriting information included in the parent token. A token that derivatively inherits the information of a parent token and is issued with additional information capable of specifying an application when the image forming apparatus redelegates authority will be referred to as a "child token". A plurality of child tokens will be referred to as a subset altogether.

The child token is issued by an image forming apparatus or the like to which authority is delegated without intervening authorization processing by the user. The child token is excluded from the target of revocation processing.

[System Arrangement]

Figure 15:
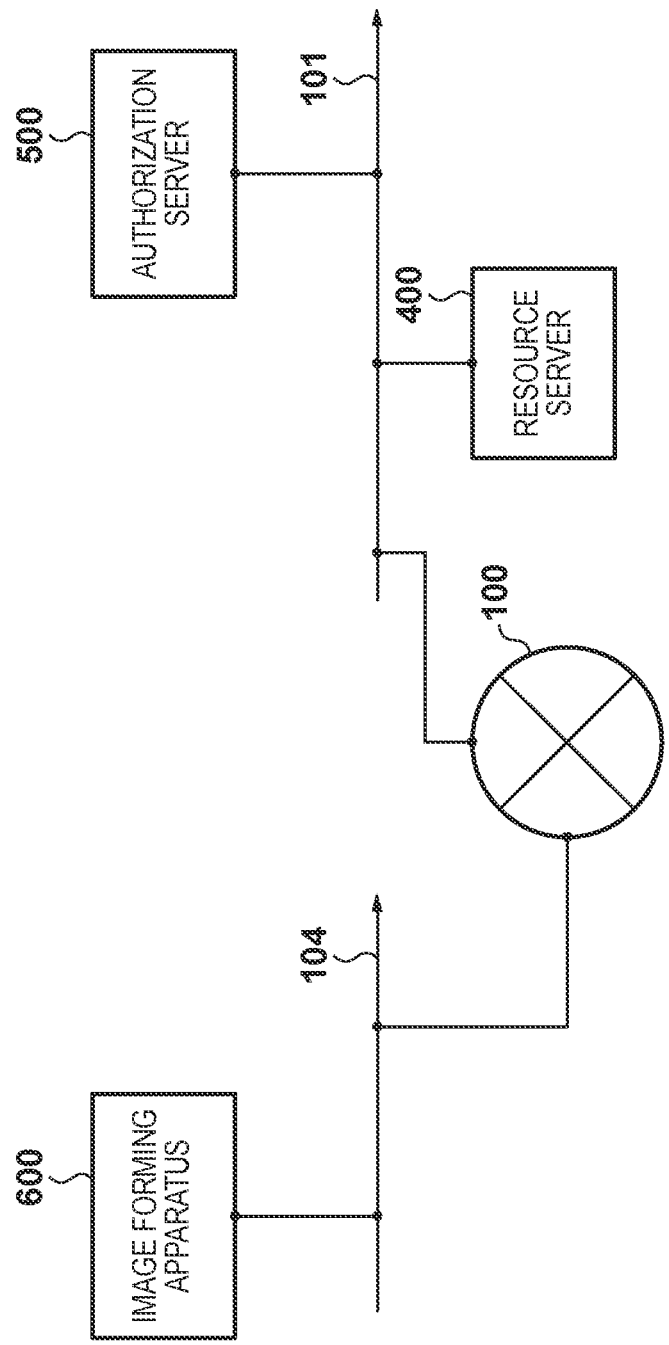
FIG. 15 is a block diagram showing an example of a system arrangement according to the second embodiment.

FIG. 15 illustrates an example of the arrangement of an authorization system according to this embodiment. A WWW system is constructed in a WAN 100. A LAN 101 connects constituent elements.

An authorization server 500 implements OAuth, and an authorization service module is installed in it. A resource service corresponding to a print application or form application is installed in a resource server 400. One or a plurality of resource service cooperation applications are installed in an image forming apparatus 600. The user uses a resource service using a resource service cooperation application. The authorization server 500, the resource server 400, and the image forming apparatus 600 are connected via the WAN 100 and the LAN 101. Note that the authorization server 500, the resource server 400, and the image forming apparatus 600 may be constructed on individual LANs or same LAN. The authorization server 500 and the resource server 400 may be constructed on the same server.

The image forming apparatus 600 has the function of the client application server 300 and that of the client PC 200 shown in FIG. 1. The child token is used in the image forming apparatus 600 having these functions. Note that the apparatus on the client side is not limited to the image forming apparatus and may be another device.

[Table Arrangement]

FIG. 16 shows a token management table 2000 showing an example when a parent token and a child token are issued for a token management table 1410 shown in FIG. 10C in the authorization server 500. The token management table 2000 includes a token ID 2001, a token type 2002, an expiration date 2003, a scope 2004, a refresh token ID 2005, a refresh expiration date 2006, a client ID 2007, a user ID 2008, an application ID 2009, and a grant type 2010. The token management table 2000 according to this embodiment and FIG. 10C described in the first embodiment are different in that information of a "parent token" or "child token" is identifiably set in the token type 2002. Hence, in revocation as well, control is done by looking up this value.

[Token Revocation]

Token revocation according to this embodiment is performed basically as in the first embodiment. However, when a client is determined to be an image forming apparatus, no token is deleted in step S909 of FIG. 8B. In this example, when the client ID in the token management table 2000 is "dev00000001", the token is not deleted even if Grant Type is "AuthzCode".

This aims at preventing a token from being carelessly disabled assuming a case where an application in the image forming apparatus is performing processing using a child token as in scheduled printing execution by the image forming apparatus. For example, if a child token can be deleted, mismatch may occur in the system because of deletion of a child token generated without involvement of the user. Note that processing performed using a child token is not limited to scheduled printing execution and may include background processing executed without direct involvement of the user.

This makes it possible to flexibly construct an authorization system that causes no mismatch in addition to the effect of the first embodiment.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-131063, filed Jun. 21, 2013, which is hereby incorporated by reference herein in its entirety.

What is claimed is:

1. An authorization server system that manages authorization information configured to enable providing of a service without requiring input of authentication information, comprising:
    a memory storing instructions;
    a processor executing said instructions to implement;
    a management unit configured to manage authorization information;
    a providing unit configured to provide a deletion screen that includes authorization information generated when an authorization operation of a user is performed but not authorization information generated without performing the authorization operation of the user, in accordance with reception of a request of the deletion screen configured to delete the authorization information managed by the management unit; and
    a deletion unit configured to delete the authorization information managed by the management unit, in accordance with reception of a deletion instruction via the deletion screen,
    wherein the authorization information generated when the authorization operation of the user is performed is information that, when the authorization server system performs authentication processing based on user information, issues an authorization code depending on execution of an authorization operation on an authorization confirmation screen provided to a user depending on a success of the authentication processing, and performs verification of the authorization code when receiving a request of authorization information, is issued depending on a success of the verification of the authorization code, and
    wherein the authorization information generated without performing the authorization operation of the user is information that, when the authorization server system performs authentication processing based on user information, issues an authentication token depending on a success of the authentication processing without providing the authorization confirmation screen to the user, and performs verification of the authentication token when receiving a request of authorization information, is issued depending on a success of the verification of the authentication token.

2. The system according to claim 1, wherein the management unit manages the authorization information in association with an authorized client, and
    the deletion screen is displayed so as to enable the deletion instruction of the authorization information for each client.

3. The system according to claim 2, wherein upon receiving the deletion instruction of the authorization information for the client via the deletion screen, the deletion unit deletes the authorization information generated when the authorization operation of the user is performed but not the authorization information generated without performing the authorization operation of the user out of the authorization information associated with the client.

4. The system according to claim 2, wherein the deletion screen does not display the client with which only the authorization information generated without performing the authorization operation of the user is associated.

5. The system according to claim 1, wherein the management unit identifiably manages first authorization information corresponding to first authority delegated from the user to the client and second authorization information generated in correspondence with second authority redelegated derivatively from the first authority, and
    the deletion unit does not delete the second authorization information upon receiving the deletion instruction via the deletion screen.

6. The system according to claim 1, wherein the authorization information generated when the authorization operation of the user is performed is generated when an apparatus for receiving providing of the service using the authorization information and an apparatus for providing the service belong to different security domains.

7. The system according to claim 1, wherein the authorization information generated without performing the authorization operation of the user is generated when an apparatus for receiving providing of the service using the authorization information and an apparatus for providing the service belong to the same security domain.

8. A control method of an authorization server system that manages authorization information configured to enable providing of a service without requiring input of authentication information, comprising:

managing authorization information in a storage unit;

providing a deletion screen that includes authorization information generated when an authorization operation of a user is performed but not authorization information generated without performing the authorization operation of the user, in accordance with reception of a request of the deletion screen configured to delete the authorization information managed in the storage unit; and deleting the authorization information managed in the storage unit in accordance with reception of a deletion instruction via the deletion screen, wherein the authorization information generated when the authorization operation of the user is performed is information that, when the authorization server system performs authentication processing based on user information, issues an authorization code depending on execution of an authorization operation on an authorization confirmation screen provided to a user depending on a success of the authentication processing, and performs verification of the authorization code when receiving a request of authorization information, is issued depending on a success of the verification of the authorization code, and wherein the authorization information generated without performing the authorization operation of the user is information that, when the authorization server system performs authentication processing based on user information, issues an authentication token depending on a success of the authentication processing without providing the authorization confirmation screen to the user, and performs verification of the authentication token when receiving a request of authorization information, is issued depending on a success of the verification of the authentication token, wherein a processor and a memory function to perform at least one of the management step, providing step and deletion step.

9. A non-transitory computer-readable medium storing a program that causes a computer to function as an authorization server system that manages authorization information configured to enable providing of a service without requiring input of authentication information, the program comprising code to execute:

managing authorization information in a storage unit;

providing a deletion screen that includes authorization information generated when an authorization operation of a user is performed but not authorization information generated without performing the authorization operation of the user, in accordance with reception of a request of the deletion screen configured to delete the authorization information managed in the storage unit; and deleting the authorization information managed in the storage unit in accordance with reception of a deletion instruction via the deletion screen, wherein the authorization information generated when the authorization operation of the user is performed is information that, when the authorization server system performs authentication processing based on user information, issues an authorization code depending on execution of an authorization operation on an authorization confirmation screen provided to a user depending on a success of the authentication processing, and performs verification of the authorization code when receiving a request of authorization information, is issued depending on a success of the verification of the authorization code, and wherein the authorization information generated without performing the authorization operation of the user is information that, when the authorization server system performs authentication processing based on user information, issues an authentication token depending on a success of the authentication processing without providing the authorization confirmation screen to the user, and performs verification of the authentication token when receiving a request of authorization information, is issued depending on a success of the verification of the authentication token.

* * * * *